UNITED STATES PATENT OFFICE.

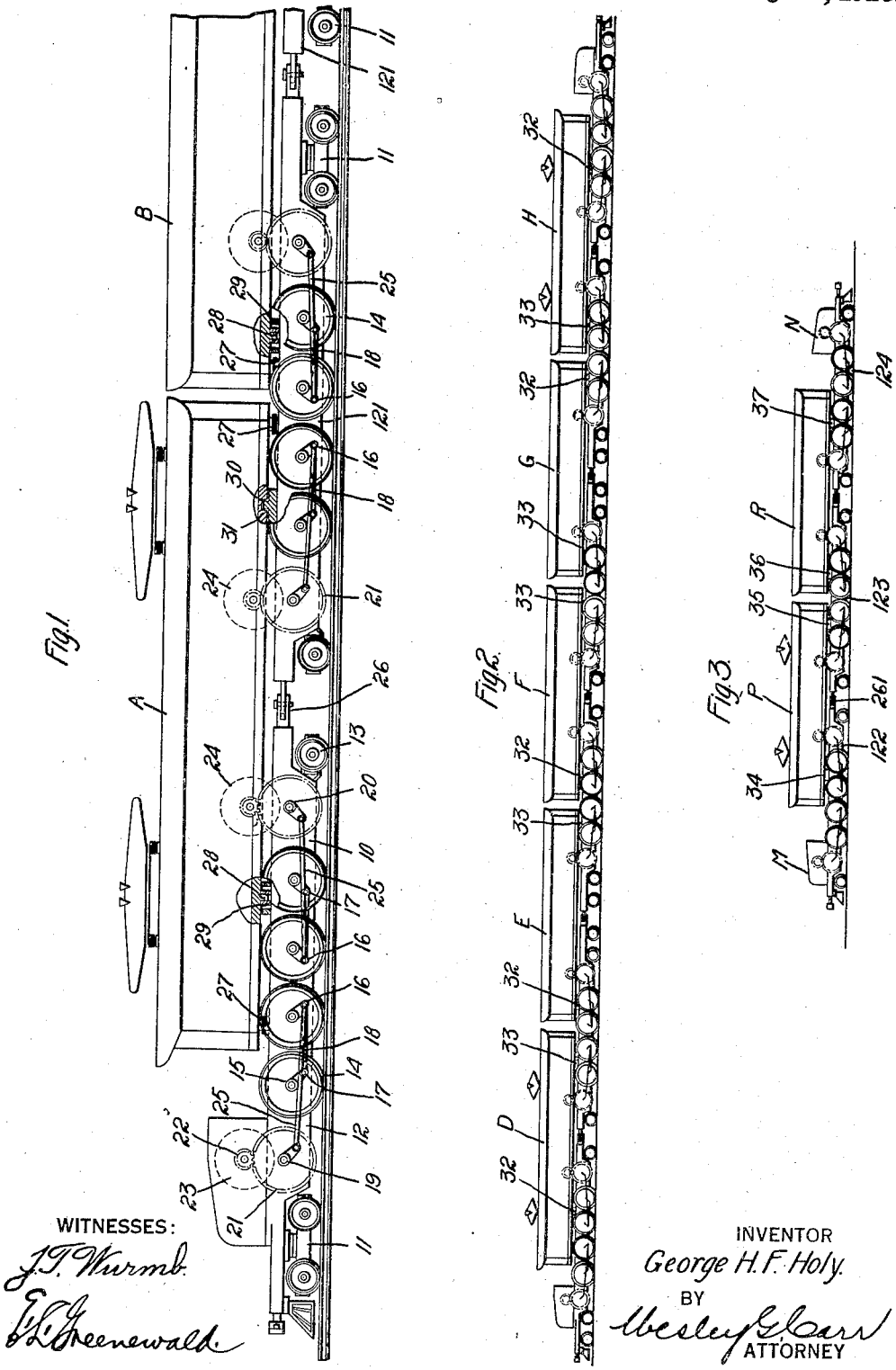

GEORGE H. F. HOLY, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRIC LOCOMOTIVE.

1,351,039.  Specification of Letters Patent.  Patented Aug. 31, 1920.

Application filed April 9, 1918. Serial No. 227,430.

*To all whom it may concern:*

Be it known that I, GEORGE H. F. HOLY, a citizen of the United States, and a resident of Pittsburgh, in the county of Allegheny and State of Pennsylvania, have invented a new and useful Improvement in Electric Locomotives, of which the following is a specification.

This invention relates to electric vehicles and particularly to electric locomotives embodying a multiple number of cab bodies carried by a multiple number of running gear units.

The principal object of the invention is to provide an electric locomotive of large capacity that shall consist of a minimum number of cabs for uniformly distributing the weight of the electrical equipment on all the driving units.

Another object of the invention is to provide a truck for locomotives or other railway vehicles that shall have two pivotal bearings or center pins for connection of the truck to the cabs mounted thereon.

The above and other objects and the novel features of the invention will be apparent from the following description taken in connection with the accompanying drawing which constitutes a part of this invention and in which Figure 1 is a side elevation of a part of an electric locomotive embodying the invention, parts being broken away to disclose details of construction; Fig. 2 is a side elevation, on a smaller scale, of a five-cab electric locomotive embodying the invention, and Fig. 3 is a side elevation, on the same scale as Fig. 2, of a two-cab electric locomotive embodying this invention.

Referring to Fig. 1 of the drawing, 10 designates a running-gear unit, preferably consisting of a four-wheel swivel and swing bogie truck 11 connected to one end of the frame 12, and a two-wheel radial truck 13 connected to the other end of the frame. The driver wheels of the running gear unit are located between the wheels of the trucks 11 and 13 and, in the present construction, the driver truck consists of eight wheels 14 rigidly secured, in pairs, to the ends of the axles 15 mounted in the side members of the frame 12. The crank pins 16 and 17 of adjacent wheels, on each side of the eight-wheel truck, are connected together, in pairs, by side rods 18.

Jack shafts 19 and 20 are mounted in the truck frame 12 outside the rigid wheel base of the eight-wheel driver truck and carry suitable gears 21 meshing with pinions 22 on the ends of the armature shafts of the motors 23 and 24, which are also mounted on the frame 12 outside the rigid wheel base. The crank pins of the jack-shaft gears are connected by main driving rods 25 to the inner driver crank pins 16, thereby applying the driving effort directly to the crank pins most remote from the jack shafts. The running-gear units are articulated together by suitable articulation links 26 or, if preferred, by Mallet hinges, so that all of the units shall be associated together to form a complete running gear for supporting the several cabs of the locomotive.

The running gear of the locomotive shown in Fig. 1 carries three cabs, A, B, and another end cab similar to the end cab A. Each cab carries a pair of body bolsters provided with suitable center bearings or pivots for connecting the ends of the cab body to the trucks which support it. Each cab also has one or more pairs of solid or resilient side bearings 27 at each end thereof mounted on corresponding side bearings on the truck frame to transmit and uniformly distribute the weight of the cab body and electrical apparatus therein to the trucks. One of the center bearings of each cab body consists of a rigid center pin 28 on the body bolster fitting into a socket in a longitudinally slidable center bearing 29 on the truck bolster directly below it. This floating connection between the cab body and the truck permits relative longitudinal movements of the running-gear unit and cab body, as well as serving to pivot the body on the truck, but restrains the movement of the cab laterally of the truck. The other end of the cab body carries a bolster provided with a socket 30 to receive a rigid center pin 31 on the truck bolster. The connection between the pin 31 and the socket 30 restrains relative lateral and longitudinal movements of the truck and cab body but forms a pivotal bearing connection between these parts so that the cab may swivel on the truck. If desired, the relative positions of the fixed and floating center pins may be reversed.

It will be observed that the end running gear 12 carries two driving motors and also supports one end only of the cab body A, that contains a part of the electrical equipment of the locomotive. The other end of the locomotive of Fig. 1 is similar, in all respects, to the end shown. Each of the intermediate running gear units 121, of which there are two in the locomotive shown in Fig. 1, is equipped with two truck bolsters, one of the bolsters carrying a rigid center pin 31 projecting into a socket 30 on the body bolster of one of the end cabs A. Each of the intermediate running-gear units also carries a floating socket member 29 having a limited movement longitudinally of the running gear and adapted to receive a rigid center pin 28 on the body bolster of the intermediate cab body B. Each intermediate running gear unit is therefore equipped with two driving motors located outside the wheel base of the eight-wheel driver truck and two center bearings or pins located within the rigid wheel base of the driver truck and in the central longitudinal plane of the running-gear unit. By the arrangement illustrated in Fig. 1, three cab bodies are mounted on four running-gear units in such a manner that none of the draft or bumping strains will be transmitted through the cab bodies. This type of locomotive construction makes it possible to equip each locomotive with a large motor capacity and, at the same time, to uniformly distribute the weight of the electrical equipment on all of the running-gear units.

The locomotive illustrated in Fig. 2 embodies the same principles of construction as the one illustrated in Fig. 1. In Fig. 2, the locomotive construction consists of a series of five cabs mounted on a running gear consisting of a series of six running-gear units, all of which are articulated together to form a complete running gear. Each of the end running-gear units is similar to the end running-gear unit illustrated in Fig. 1, and the intermediate running-gear units are constructed in the same manner as the running-gear unit 121 in Fig. 1. Each of the end cabs D and H in Fig. 2 is connected to its supporting running-gear units by two center pins 32 and 33, one of which is a floating center pin permitting relative longitudinal movement of the running-gear unit and the cab body. Each of the intermediate running-gear units is connected by a fixed center-pin bearing and a floating center-pin bearing to adjoining ends of the cab bodies supported thereby. The locomotive shown in Fig. 2 practically involves only an addition of two cab bodies, such as the cabs E and G and their corresponding running-gear units, to a locomotive construction such as the one shown in Fig. 1, the cab body F of Fig. 2 corresponding to the cab B of Fig. 1.

In Fig. 3 is illustrated another form of locomotive which embodies two cabs mounted on three running-gear units 122, 123 and 124, the units 122 and 124 being similar, in all respects, to the running-gear unit 12 of Fig. 1 and articulated to the intermediate unit 123 by articulation links 261. The cab structure of this locomotive, however, includes two small end hoods M and N which are rigidly mounted on the outer ends of the running-gear units 122 and 124, and two intermediate larger cab bodies P and R, the cab P being connected by fixed center pin 34 to the running-gear unit 122 and by a floating center-pin bearing 35 to the runing-gear unit 123 and the cab R being connected by the fixed and floating center pins 36 and 37, to the trucks 123 and 124, respectively. In this manner, a locomotive construction is obtained that embodies two separate cab bodies carried by a running gear consisting of three articulated running-gear units.

In the locomotives shown, the running-gear-units exceed the number of separate cab bodies supported thereon and pivotally connected thereto. Each of the running-gear units consists of a multiple number of motors associated with jack shafts and gears located outside the rigid wheel base, and a side rod connected to the separately rotating driving wheels in the rigid wheel base. It will be understood, however, that, in some designs of locomotives embodying this invention, the motors may be mounted within the rigid wheel base. The center bearings and pins, as well as the side bearings, are also preferably disposed within the rigid wheel base of the drivers.

While I have shown and described the arrangement of parts in detail, it is understood that I do not wish to be limited to the exact constructions illustrated, since various changes may be made therein without departing from the scope of the invention as expressed in the appended claims.

I claim as my invention:

1. A vehicle comprising a plurality of single frame rigid wheel base trucks, a portion of said trucks being equipped with two or more center pins for maintaining pivotal connection with vehicle bodies mounted on said trucks, and having articulation links for connecting adjacent trucks whereby the draft strains are transmitted through said trucks.

2. A locomotive comprising a plurality of single frame rigid wheel base trucks, a portion of said trucks being equipped with two or more center pins for maintaining pivotal connection with cabs mounted on said trucks, side bearings on said trucks for supporting said cabs, and articulation links for connecting adjacent trucks whereby the draft strains are transmitted through said trucks.

3. An electric locomotive having a plurality of cab bodies and means for supporting said bodies comprising a plurality of single frame wheel base trucks, certain of said trucks being provided wtih a plurality of center pins for maintaining the cab bodies mounted thereon in longitudinal and side register, and having an articulation link at each end for connecting adjacent trucks and for transmitting draft strains through said trucks.

4. An electric locomotive having a plurality of cab bodies and means for carrying said bodies comprising end trucks and one or more intermediate single frame rigid wheel base trucks, each of the intermediate truck or trucks being equipped with two center bearings for maintaining the cab bodies in longitudinal and side register, and with articulation links for connecting adjacent trucks and for transmitting draft strains through said trucks.

5. An electric locomotive comprising a plurality of cabs and means for supporting said cabs comprising a plurality of driver trucks, the number of driver trucks being different from the number of cabs pivotally connected thereto.

6. An electric locomotive comprising an odd plural number of cab bodies and means for supporting said bodies and pivotally connecting them together comprising an even number of running-gear units.

7. A single frame rigid wheel base locomotive truck having two bolsters provided with means for pivotally connecting the ends of two bodies thereto, said truck also being provided with side bearings for supporting the ends of said bodies, and having articulation links for connecting adjacent trucks and for transmitting draft strains through said trucks.

8. An electric locomotive comprising a plural number of cab bodies, and means for supporting said bodies and pivotally connecting them together, comprising a plural number of single frame rigid wheel base driving trucks, having articulation links for connecting adjacent trucks and for transmitting draft strains through said trucks.

9. An electric locomotive comprising an odd plural number of cab bodies and means for supporting said bodies comprising a greater even number of running-gear units.

10. An electric locomotive comprising a plurality of articulated running-gear units, and a plurality of cab bodies mounted thereon, each of the end running gear units being pivotally connected to a single end cab body and the intermediate cab body or bodies being pivotally connected to two adjoining running-gear units and extending over and across the articulated connection therebetween.

In testimony whereof, I have hereunto subscribed my name this 30th day of March, 1918.

GEORGE H. F. HOLY.